(12) United States Patent
Comeau

(10) Patent No.: US 7,159,223 B1
(45) Date of Patent: Jan. 2, 2007

(54) METHODS AND SYSTEMS FOR APPLICATIONS TO INTERACT WITH HARDWARE

(75) Inventor: Guillaume Comeau, Hull (CA)

(73) Assignee: ZW Company, LLC, LaJolla, CA (US)

( * ) Notice: Subject to any disclaimer, the term of this patent is extended or adjusted under 35 U.S.C. 154(b) by 0 days.

(21) Appl. No.: 09/570,252

(22) Filed: May 12, 2000

(51) Int. Cl.
G06F 9/46 (2006.01)
G06F 9/44 (2006.01)

(52) U.S. Cl. .................. 719/310; 717/106

(58) Field of Classification Search .......... 719/310; 717/106; 711/100
See application file for complete search history.

(56) References Cited

U.S. PATENT DOCUMENTS

| | | | |
|---|---|---|---|
| 5,937,411 A * | 8/1999 | Becker | 707/103 R |
| 6,110,226 A * | 8/2000 | Bothner | 717/153 |
| 6,446,254 B1 * | 9/2002 | Chapman et al. | 717/116 |
| 6,594,708 B1 * | 7/2003 | Slaughter et al. | 709/315 |

OTHER PUBLICATIONS

Paran, Real Time Language Accelerator, May 22, 1998.*

Ritchie, Stuart; Systems Programming in Java; IEEE Micro; May/Jun. 1997; pp. 30-35.

DeCastro, Alex; JavaOS Architecture; Apr. 4, 1998, pp. 1-5.

* cited by examiner

Primary Examiner—William Thomson
Assistant Examiner—Lechi Truong (57) ABSTRACT

A method of providing Java application layer access to hardware peripheral memory mapped registers is provided together with a processor adapted to implement such a method. A fixed memory address space for a hardware peripheral's memory mapped registers is identified, and a Java object is constructed having elements which occupy this fixed memory address space. This allows a Java application to be provided with access to the hardware peripheral's memory mapped registers directly through the Java object. A new Java class is defined having base address and length parameters and in some cases also having a type parameter. This is used in constructing the Java object. When a Java object has an object descriptor which is effectively an object header and a pointer to where the object data is located, constructing the Java object may be done by creating an object descriptor, and then creating an object handle for the Java object which points to the object descriptor. Alternatively, a level of indirection may be removed, and the object handle created to point directly to the object created so as to exist in memory mapped register space.

4 Claims, 5 Drawing Sheets

MEMORY MAP

METHODS AND SYSTEMS FOR APPLICATIONS TO INTERACT WITH HARDWARE

FIELD OF THE INVENTION

The invention relates to methods and systems for applications to interact with hardware, and more particularly for applications in languages such as Java which lack an ability to access particular memories directly, to interact with hardware peripherals.

BACKGROUND OF THE INVENTION

Typical software systems include an application program run by an operating system on a processor connected to a number of hardware peripherals. In some systems, such as those where the Java language is employed, there is additionally a virtual machine such as a Java virtual machine (JVM) situated between the operating system and the application program.

In order to facilitate communication with the hardware peripherals, nearly all complex software systems include a device driver which is specific to each hardware peripheral. These device drivers provide a layer of abstraction to their clients (the operating system and ultimately the application program) while allowing them to use the underlying hardware peripherals.

However, device drivers are notoriously difficult to debug or troubleshoot due to the asynchronous nature of their coupling with interrupts and due to the lack of debugging features. A faulty driver can also inhibit user input and/or user output. At interrupt levels, the system cannot provide support for the common user state input/output functionality. Furthermore, since timing is often critical, it is impossible to stop a processor and trace device driver code in a non-destructive way. Also, because of the way systems are developed, frequently different development teams are responsible for different layers of a design. When interface problems develop, it is often difficult to determine where the problem originated and hence which team should fix the problem.

Consequently, device drivers take more time to develop and their opacity makes them more error-prone. One of the most common errors which may occur during driver development is an error in pointer arithmetic which instructs the processor to access an erroneous location. Systems generally allow this initially and operation resumes without any apparent disturbance until a later point in time where the value in question is used.

While this is not a big problem for large computing platforms with standardized peripheral interfaces, and a standardized layered architecture, it becomes a very serious problem for application specific hardware and devices where for each new design, the application peripheral path must be debugged from scratch.

Common safeguard measures against pointer arithmetic errors include software range checking. Some languages, such as Java, have inherent measures which prevent invalid memory accesses. However, using the built-in range checking of standard Java to develop device drivers is currently impossible as one of the fundamental characteristics of Java is that any client machine should be protected from corruption/bugs in Java, i.e. any bug in a Java application should only effect the Java application and should have no effect on other applications and memory unrelated to the Java application. To achieve this level of security, Java applications running on the JVM are not given direct access to memory. Instead, memory access is done through an indirection mechanism through the JVM.

Figure 1:
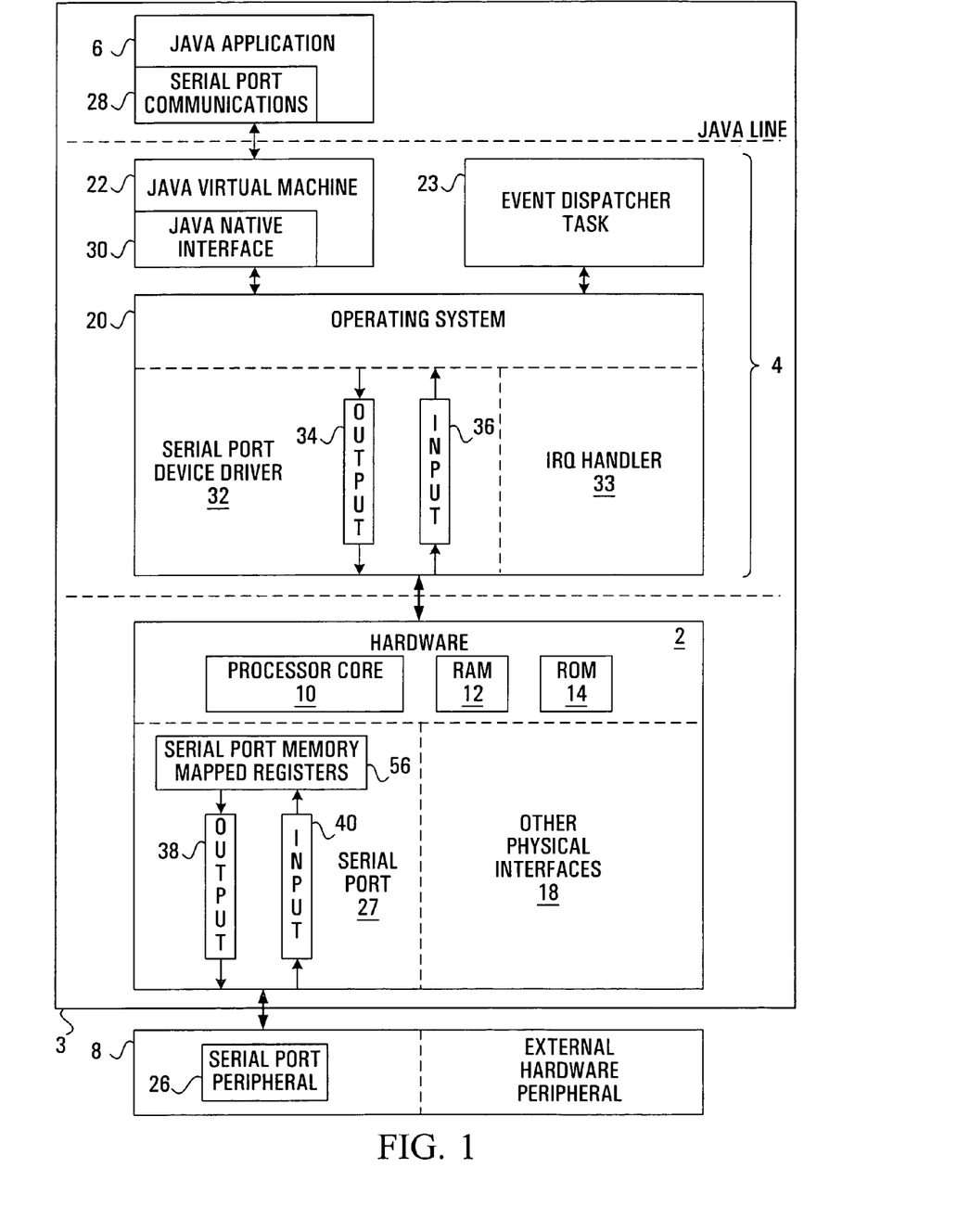
FIG. 1 is a block diagram of a typical Java environment.

Referring now to FIG. 1, a conventional embedded environment 3 typically has hardware 2, software in the form of native code 4 (or assembly language), and software in the form of a Java application 6. Also shown are externally connected hardware peripherals 8. The hardware 2 consists of a processor core 10, memory in the form of RAM 12 and/or ROM 14 and one or more physical interfaces 18 including for example a serial port 27. The software 4 running on the processor 10 includes an operating system 20 over top of which is run a Java virtual machine 22 as a task, and also over which other tasks such as an event dispatcher task 23 is run. The Java application 6 uses the resources and features of the Java virtual machine 22.

FIG. 1 also shows the details of a typical path from the Java application 6 to and from a particular hardware peripheral 8 which for the purpose of this example we will assume is the serial port peripheral 26 connected through the serial port 27. The Java application 6 includes functionality 28 for either generating data ultimately for output to the serial port 27, or for processing data ultimately received from the serial port 27. Of course the functionality 28 does not interact with the serial port 27 directly. The Java virtual machine 22 has a Java native interface 30 through which the Java application 6 communicates with the serial port physical interface 27. The operating system 20 has a serial port device driver 32 which has an input queue 34 and an output queue 36, through which it communicates with the underlying hardware 2. The serial port device driver 32 is typically run at interrupt level, or through a deferred procedure call within the operating system kernel (not shown). More specifically, the serial port device driver 32 communicates with the serial port 27 through serial port memory mapped registers 56 to an input queue 38 and an output queue 40 and on to the hardware peripheral 26. The operating system 20 also has an IRQ (interrupt request) handler 33 for each interrupt from any hardware peripheral.

When the Java application 6 has to communicate with the hardware peripherals 8 and in this case the serial port peripheral 26, a path such as that consisting of the serial port communications 28→Java virtual machine 22→Java native interface 30→operating system 20→serial port device driver 32→serial port physical interface 27→serial port hardware peripheral 26 must be established and debugged for each different hardware peripheral. More specifically, when the Java application 6 has data to send to the serial port peripheral 28, the Java application 6 communicates with the device driver 32 using the Java native interfaces 30. The JNI 30 takes the data, formats it and passes it on to the device driver 32 by copying it into the output buffer 34. The serial port device driver 32 transfers the data to the serial port memory mapped registers 56 of the serial port 27. These are copied into the hardware queue 38 in the serial port 27 for output.

When the serial port 27 receives data destined for the Java application 6, an even more complicated path is taken. For communication originating from the hardware, the process typically goes as follows. To begin, the arrival of data at the serial port 27 triggers the assertion of a hardware interrupt. When this occurs, the program flow is interrupted, and the IRQ handler 33 starts an interrupt service routine. The interrupt service routine calls the serial port device driver 32 which reads the data from the hardware input queue 40 in the serial port 27 and copies it into the input queue 36 which is one of the device driver's data structures. The serial port device driver 32 then posts an event to the event dispatcher task 23. The interrupt service routine returns and normal Java operation resumes. The event dispatcher task 23 sends an event to one of the destination threads 6 to read from the input queue 36 of the serial port device driver 32, for example through a piping mechanism provided by the JNI 30.

It can be clearly seen that there are a large number of areas where bugs may make their way into the design of such a Java application—hardware peripheral interaction. Furthermore, each copying stage forces power consuming and processor intensive operations which are inevitable due to the abstractions of the operating system 20 and the JVM 22.

SUMMARY OF THE INVENTION

It is an object of the invention to obviate or mitigate one or more of the above-identified disadvantages.

One embodiment of the invention provides a method of providing Java application layer access to hardware peripheral memory mapped registers. A fixed memory address space for a hardware peripheral's memory mapped registers is identified, and a Java object is constructed having elements which occupy this fixed memory address space. This allows a Java application to be provided with access to the hardware peripheral's memory mapped registers directly through the Java object.

A new Java class may be defined having base address and length parameters and in some cases also having an element length parameter. This is used in constructing the Java object.

In an embodiment applicable when a Java object has an object descriptor which is effectively an object header and a pointer to where the object data is located, constructing the Java object may be done by creating an object descriptor, and then creating an object handle for the Java object which points to the object descriptor.

Preferably, the new Java class having a class name <class name>, for example, "AnchoredArray" is defined as follows:

<class name> (base, length)

where <class name> is the name assigned to the new class. Optionally, a parameter "type" might also be provided which specifies the type of object to be created. If multiple types are not contemplated, then this parameter would not be required. In the examples which follow, a default type of integer array is assumed. The parameter "base" specifies a beginning address, and length is a parameter specifying a number of elements in the object, which when constructed, generates an object descriptor having the specified type, base, length, and also generates a handle to the object descriptor.

In another embodiment, a level of indirection is removed, and the object handle points directly to the object created so as to exist in memory mapped register space. In so doing, preferably, a memory map is defined having a predetermined address space for the peripheral, and having at least one additional address space allocated contiguous with the predetermined address space. Object header information for the Java object is stored directly in the additional address space.

Other embodiments provide a Java object defined such that it overlaps with a predetermined address space; a Java class which enables a Java object to be defined such that it overlaps with a predetermined address space; and a Java virtual machine featuring such a class. Yet another embodiment provides an integrated circuit having a plurality of peripheral memory mapped registers and a Java virtual machine which has Java objects anchored to said peripheral memory mapped registers.

Advantageously, the embodiments of the invention permit portions of memory space defined by the object descriptor or header to be anchored to the hardware peripheral. Java application software can then use the object using standard Java methods and procedures to control the hardware peripheral with all the benefits of hardware protection and abstraction that are provided in a normal Java virtual machine. Advantageously, faster development and integration can be realized using such anchored arrays.

BRIEF DESCRIPTION OF THE DRAWINGS

Preferred embodiments of the invention will now be described with reference to the attached drawings in which.

DETAILED DESCRIPTION OF THE PREFERRED EMBODIMENTS

Figure 2:
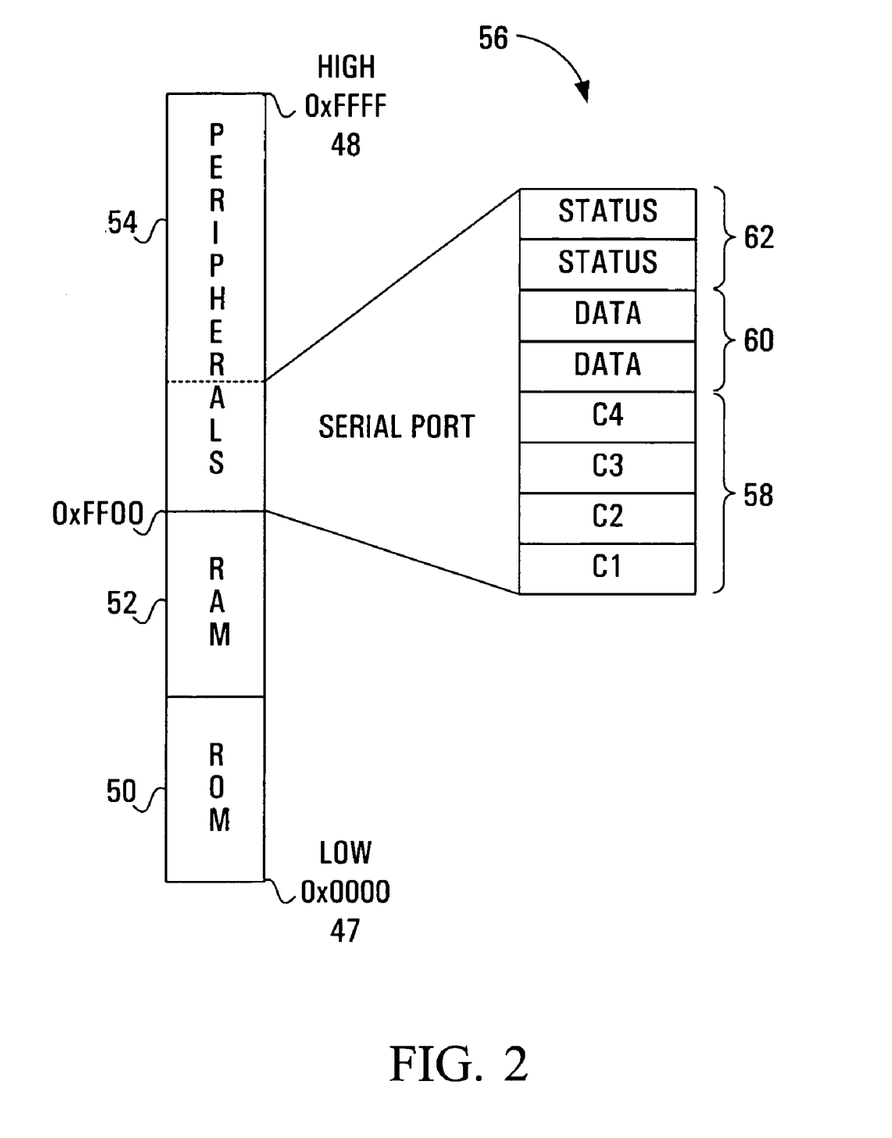
FIG. 2 is an example of a typical memory map including peripheral memory mapped registers.

Communications from a processor to hardware peripherals are typically done through registers which are mapped to a predetermined address space of the processor. Embodiments of the invention provide systems and methods for anchoring an object in Java, such as an array object, such that it overlaps with the register area of a hardware peripheral. By way of example, FIG. 2 illustrates a typical memory map showing an entire address space running from a lowest address 47 0x0000 to a highest address 48 0xFFFF for a 64 kB memory address space. Usually, a first portion 50 of the address space is reserved for ROM, a second portion 52 of the address is reserved for RAM, and a third portion 54 of memory address space is reserved for registers used by hardware peripherals. The mapping for a given peripheral, such as a serial port peripheral for example, has been expanded, as generally indicated by 56. Typically, there are a number of addresses 58 (four in the illustrated example) which map to control registers which are used to control the peripheral. There are a number of addresses 60 (two in the illustrated example) mapped to data registers through which the data flow per se occurs. These data registers would not exist for peripherals to/from which data flow is not to occur. Finally, there are typically a number of addresses 62 (two in the illustrated example) mapped to registers for accessing status information. There is a separate portion of the peripheral address space 54 for each hardware peripheral.

Figure 3A:
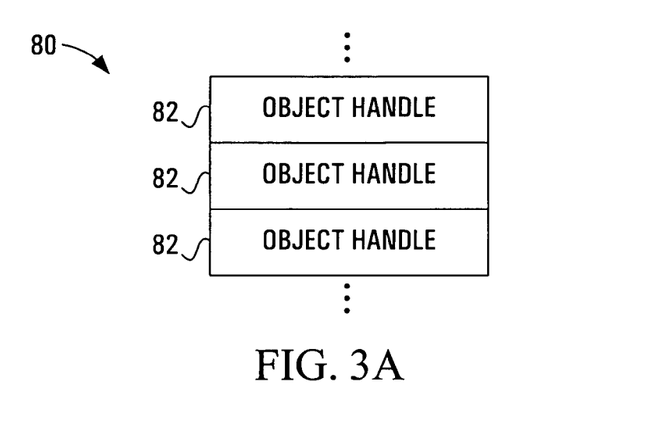
FIGS. 3A to 3C depict typical Java objects and object management structures.
Figure 3B:
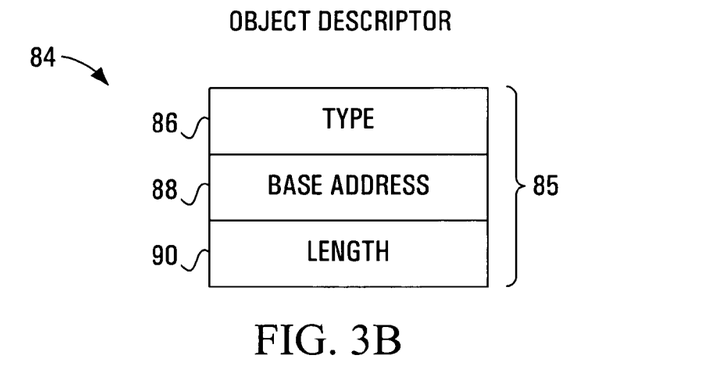
Figure 3C:
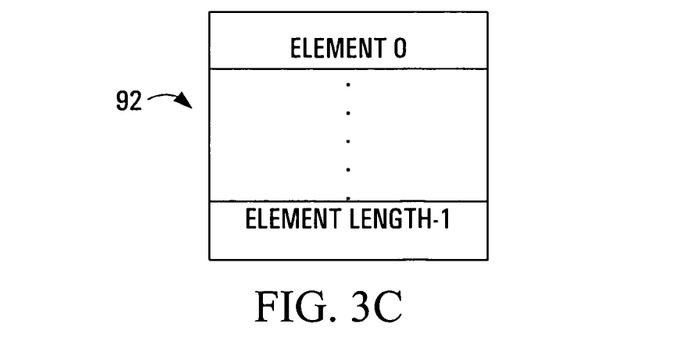
Figure 3D:
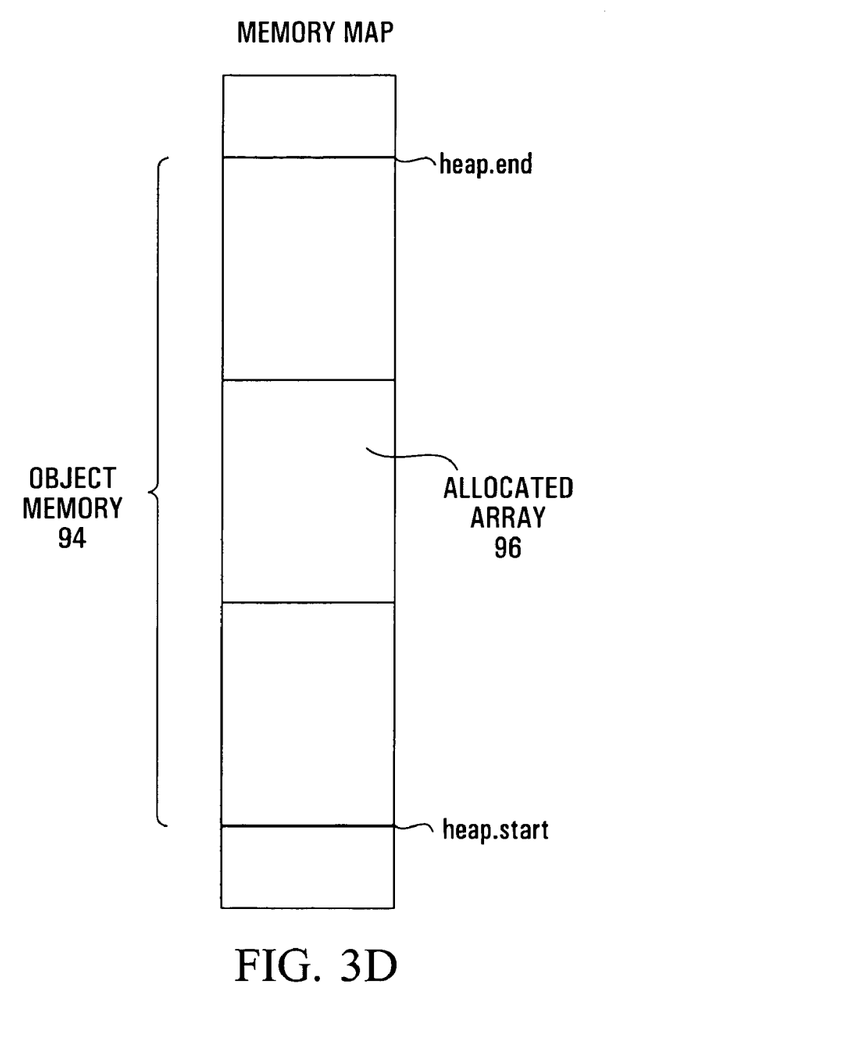
FIG. 3D is a typical memory map showing a portion of memory reserved for objects.

FIGS. 3A to 3C illustrate some of the internal memory structures of a conventional Java virtual machine such as JVM 22 of FIG. 1. In FIG. 3A, generally indicated at 80 is a list of object handles 82. Each of the handles 82 is an address which points to an object descriptor such as shown in FIG. 3B generally indicated by 84 which includes a header 85 defining an object. In the case of an array, the header 85 contains a type field 86 (identifying the object to be an array and defining the size of each element in the array and possibly other type information, and defining what type of Java garbage collection is to be performed on the object), a base address field 88, and a length field 90 in units of array elements. The base address field 88 contains the start address of array elements in memory such as array elements 92 illustrated in FIG. 3C. During normal operation, the length field 90 is compared with indexes into the array 92 to determine whether an exception must be thrown to signal an out of bounds access. In conventional systems the elements of the array structure 92 are abstracted from Java applications which therefore can never refer to them directly. Rather, as shown in FIG. 3D a section 94 of memory (typically in RAM) between the addresses heap.start and heap.end is set aside for the dynamic allocation to objects. The creation of an array at the application level would allocate a region of memory 96 selected from the available object memory 94. With the allocation, the JVM would fill in the elements of structure 84. Both the object handles 82 and the objects to which they refer are created and destroyed by the JVM 22.

According to an embodiment of the invention, a method is provided for anchoring a Java object, such as an array, to a specific area of memory, for example to a predetermined portion of memory address space for example space mapped to a hardware peripheral. While the examples provided are Java specific, the invention can also be applied to other application layer models which would otherwise restrict access to the specific memory mapped locations. To achieve this, a new Java class is defined, referred to herein as "class AnchoredArray" although of course other names may be used.

Figure 4:
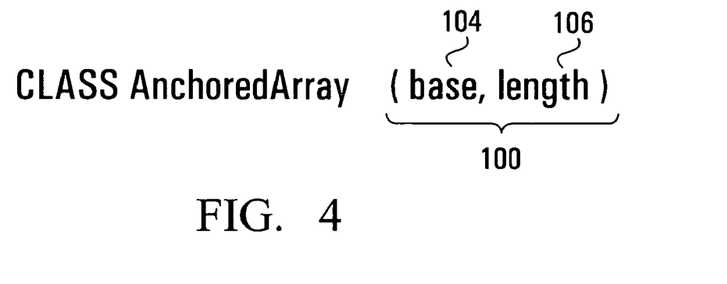
FIG. 4 is a Java class provided by an embodiment of the invention for implementing anchored Java objects.

Referring to FIG. 4, the new AnchoredArray class has a parameter list 100 containing the elements base 104, length 106 which are used to characterize a particular hardware peripheral in the sense that the base 104 is selected to be the base address of the registers in memory assigned to the particular hardware peripheral, and length 106 specifies how many elements there are in the hardware peripheral's memory mapped registers. The class might optionally be designed to include a type element for specifying an array having a certain structure. In the absence of a type, the class would need to assume a default type, for example an array of integers. This class would, upon construction (which would normally occur during system initialization), use the parameter list 100 to generate an array object descriptor 84 having an object header 85 (see FIG. 3B). (As an aside, it is noted that this differs from the construction of a normal array which is done by allocating a memory region 96 from the object memory 94 and then filling in the header 85 after the fact.) More specifically, a default value specifying an integer array, and the parameters base 104, and length 106 would be copied into corresponding type 86, base address 88, and length 90 fields in the header 85 of an array object descriptor 84. Once created, the array object descriptor is indistinguishable from a normal Java array object descriptor. The class has associated native code specifically written to achieve this function.

The array object descriptor 84 thus created would be stored in the object memory 94, and a handle 82 to the array object descriptor 84 is added to the list of object handles 80. At this point the memory space defined by the object descriptor 84 is anchored to the hardware peripheral and the Java application software can access the array using standard Java methods and procedures to control the hardware peripheral with all the benefits of hardware protection and abstraction that are provided in a normal Java virtual machine.

It is noted that the list of handles 80 and the object descriptor 84 can take many shapes and forms. The initialization can also take place when a class is loaded, or at boot time. Alternatively, a system class could let the system allocate a normal array and then replace the pointers. A specific example of pseudocode for implementing the AnchoredArray class is provided further below.

Figure 5:
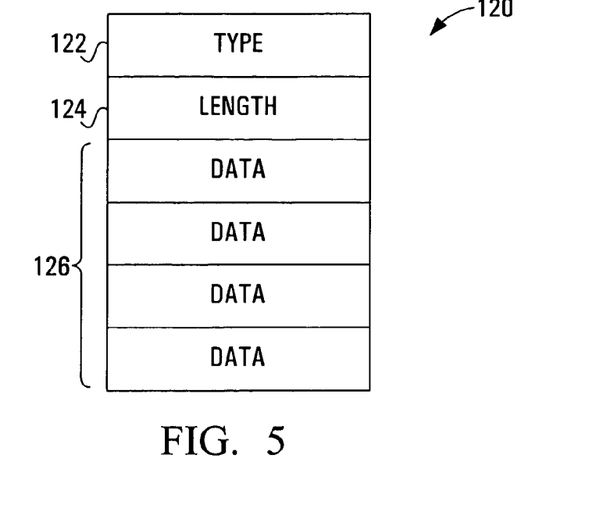
FIG. 5 is another conventional Java object structure.

A second embodiment of the invention is provided for use when the memory structure representing an object differs from that of FIGS. 3B and 3C. Referring to FIG. 5, the memory structure 120 for this embodiment has a type 122 and a length 124. Instead of a base address however, this is immediately followed by a plurality of data elements 126 which make up the body of the array. By taking away the base address, a level of indirection has been removed. This second embodiment requires peripheral memory mapped address space to conform to the defined object structure.

Figure 6:
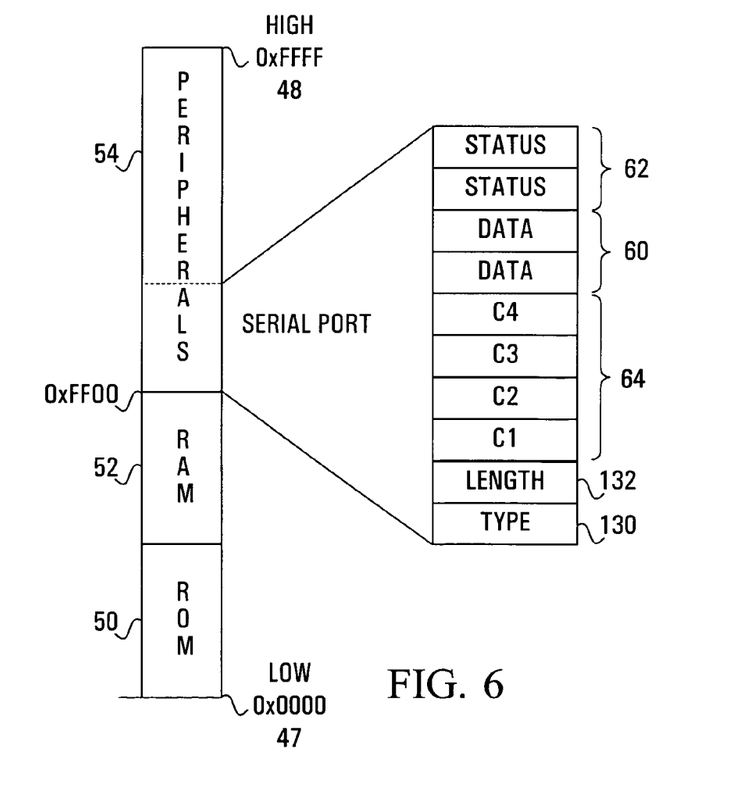
FIG. 6 is a memory map provided by an embodiment of the invention including peripheral memory mapped registers and Java object header space.

In order to map hardware peripheral address space directly to such an array object, the memory map must include the additional fields length and type either adjacent to or as part of the normal hardware peripheral memory mapped registers as depicted in FIG. 6 which is similar to the memory map of FIG. 2 except that additional registers 130,132 are provided for type and length respectively. Thus a slight change to the memory map for the hardware peripherals is required.

Hence, the object descriptor of the structure 120 must forcefully prepend the data elements, whereas the use of structure 84 provided an additional level of indirection. The absence of this additional level of indirection makes accesses to elements of the array 120 faster, but also forces the hardware peripheral address space shown in FIG. 6 to contain additional registers for the type and length fields 130,132.

These two additional registers 130,132 may be hardcoded in hardware or initialized using a dedicated base class. At initialization time, the dedicated base class ensures an object handle 72 refers directly to the base of the peripheral registers, at which point application software can use the array using standard Java methods and procedures to control the hardware devices, with all the benefits of hardware protection and abstraction that are provided in a Java virtual machine.

In another embodiment, rather than having two additional registers 130,132 for each peripheral, only two additional registers are provided for the peripheral address space collectively. Java threads reading or writing to the single composite object thus created would need to know which subgroup of registers to use. While this protects non-peripheral memory space from incorrect access, it does not prevent a thread working with one peripheral from erroneously accessing registers belonging to another peripheral.

In the Java environment, a consideration which might need to be dealt with during the construction of objects, and for our purposes the construction of objects which map to peripheral address spaces, is garbage collection. Garbage collection is the process through which the JVM performs housekeeping on the object memory. The details of Java garbage collection are well known and will not be repeated here. In order to prevent objects being garbage collected during their creation, the objects should be created as static objects using static initialization blocks. In the event dynamic objects are used, then garbage collection issues would need to be addressed. The dynamic objects might be created using the static root mechanism for example, which is also well known.

By way of example, the following is Pseudocode for an implementation of the AnchoredArray class for the case where the object structure of FIGS. 3B and 3C is employed and where the default is that the array is an integer array. The Java class is compiled with the rest of the system. Device driver classes can make use of it to access hardware.

```
Class AnchoredArray
{
    //element is an array handle which will be mapped directly onto the peripheral.
    public int element[ ];
    //The constructor takes two parameters, a base address and a length
    //The function of the constructor is to initialize element [ ] using those parameters.
    public AnchoredArrayint(baseAddress, int length)
    {
    //The action of mapping an array onto a specific area of memory is done at the native
    //level. Since a Java constructor cannot be native, the constructor calls a native
    //function lockDownElements( ) to initialize the array.
    element=lockDownElementsbase(Address,length);
    //This native function instantiates an array on a fixed memory area. It is made static
    //because it does not use the class instance.
    Static private native int[ ] lockDownElements(int baseAddress, int length);
    }
void AnchoredArray_lockDownelements( )
{
    //first, we get the two parameters off the stack. All the parameters in Java are
    //pushed onto the stack by the caller, and popped from the stack by the native
    //method. Similarly, the native functions push the result onto the stack for the caller
//to retrieve.
    int base=popStack( );
    int length=popStack( );
    //in the case where there is an indirection, we would normally allocate space for array
    //elements but in this case we don't because the base indicates where the elements
    //are. We just create the object that points to the elements.
    int *handle=malloc(SIZE_OF_HEADER);
    (instance*) handle->type=DEFAULT_TYPE
    (arrayStruct*) handle->arrayBase=base;
    (arrayStruct*) handle->length=length;
    //That's it. We are now passing the handle to Java.
    push handle;

}
```

Pseudocode follows for an example implementation of the AnchoredArray class and associated lockDownElements native function for the case where objects have the structure of FIG. 5, i.e. the length, base information is to be stored in the memory mapped registers adjacent the remaining registers.

```
Class AnchoredArray
{
public int element[ ];
public AnchoredArray(int baseAddress)
    {
    element=lockDownElements(baseAddress);
    Static private native int[ ] lockDownElements(int baseAddress);
    }

Void AnchoredArray_lockdownElements( )
{
    //first, we get the parameter off the stack. All the parameters in Java are
    //pushed onto the stack by the caller, and popped from the stack by the native
    //method. Similarly, the native functions pushes the result onto the stack for the caller
    //to retrieve.
    int base=popStack( );
    //the beginning of the peripheral. In that case, the length field is not used.
    pushStack(base);
    //that's it. We are now passing the handle to the hardcoded object to Java.
}
```

Referring back to the memory map example of FIG. 2 and in particular to the memory map details for the serial port, the base address for the serial port's address space is SPORT_BASE=0xFF00, the length is SPORT_LENGTH=8. These values would be used in the parameter list 100 when constructing the AnchoredArray class for the serial port.

The JVM would be designed to include the above discussed AnchoredArray class as part of its system classes, and for the serial port peripheral, there would be a constructor:

AnchoredArray serial_port=new AnchoredArray (SPORT_BASE, SPORT_LENGTH)

where SPORT_BASE is a constant in this case equal to 0xFF00, and SPORT_LENGTH is a constant in this case equal to 8 which would result in a handle 82 pointing to the serial_port anchored array (i.e. pointing to 0xFF00) being added to the list of handles 80 at initialization. Subsequently, indexes into the array may be done for example through expressions such as serial_port.element[C1], where C1 is a constant which indexes into the array to the register occupied by the first of the peripheral's constants 64, which would in turn provide access to that register. The Java range checking functionality would permit access through this particular handle only to the specific range of addresses defined. An attempt to access an index which would point to memory addresses outside this space would result in an exception.

Optionally, the AnchoredArray class can be declared so that application classes cannot call it if they are not part of the same Java package.

Optionally, the AnchoredArray class can be made public to allow driver classes to be put in any package and use the AnchoredArray class nonetheless.

Optionally, the AnchoredArray constructor can be protected so it can only be invoked by derived classes.

Numerous modifications and variations of the present invention are possible in light of the above teachings. It is therefore to be understood that within the scope of the appended claims, the invention may be practised otherwise than as specifically described herein.

I claim:

1. A computer implemented method of providing Java application layer access a fixed memory address space comprising:
   constructing a Java object having elements which occupy said fixed memory address space;
   whereby a Java application is provided access to the hardware peripheral's memory mapped registers directly through said Java object;
   wherein constructing a Java object comprises:
   creating an object descriptor;
   creating an object handle for the Java object which points to the object descriptor
   defining a new Java class having base address, length, and type parameters, which is used in constructing said Java object; and
   wherein new class is substantially defined in pseudocode as follows:
   Class AnchoredArray
   {
   public int element[ ];
   public AnchoredArray(int baseaddress, int length)
   {
   element=lockDownElements(baseAdress,length);
   Static private native int[ ] lockDownElements(int baseAddress, int
   length);
   }
   void AnchoredArray_lockDownelements( )
   {
   int base=popstack( );
   int length=popstack( );
   int *handle=malloc(SIZE_OF_HEADER);
   (instance*) handle->type=DEFAULT_TYPE;
   (arrayStruct*) handle->arrayBase=base;
   (arrayStruct*) handle->length=length;
   push handle;
   }.

2. A computer implemented method of providing lava application layer access a fixed memory address space comprising:
   constructing a Java object having elements which occupy said fixed memory address space;
   whereby a Java application is provided access to the hardware peripheral's memory mapped registers directly through said Java object;
   identifying the fixed memory address space to be a hardware peripheral's memory mapped registers;
   wherein constructing a lava object comprises:
   defining a memory map having a predetermined address space for the hardware peripheral, and allocating at least one additional address space contiguous with the predetermined address space;
   storing object header information for the Java object directly in the additional address space;
   creating an object handle for the lava object which points to the object header;
   defining a new Java class having a base address parameter which is used in constructing said Java object;
   wherein the new Java class is substantially defined in pseudocode as follows:
   Class AnchoredArray
   {
   public int element[ ];
   public AnchoredArray(int baseAddress)
   {
   element=lockDownElements(type,baseAddress);
   Static private native int[ ] lockDownElements(int baseAddress);
   }
   Void AnchoredArray-lockdownElements( )
   {
   int base=popstack( );
   pushStack(base);
   }.

3. A computer implemented method of providing application layer access to a fixed memory address space for an application in a language designed to prevent accessing particular memory locations directly, the method comprising:
   constructing an object in the context of the language having elements which occupy said fixed memory address space;
   whereby the application is provided access to the fixed memory address space directly through said object;
   defining a new class having a class name <class name> as follows:
   <class name> (base, length);
   where <class name> is the name assigned to the new class, base is a parameter which specifies a type of object, base is a parameter which specifies a beginning address, and length is a parameter specifying a number of elements in the object, which when constructed, generates an object descriptor specifying base, length, and a generates a handle which points to the object descriptor;
   wherein the new class is substantially defined in pseudocode as follows:
   Class AnchoredArray
   {
   public int element[ ];
   public AnchoredArray(int baseaddress, int length)
   {
   element=lockDownElements(baseAdress,length);
   Static private native int[ ] lockDownElements(int baseAddress, int
   length);
   }
   void AnchoredArray_lockDownelements( )
   {
   int base=popstack( );
   int length=popstack( );
   int *handle=malloc(SIZE_OF_HEADER);
   (instance*) handle->type=DEFAULT_TYPE;
   (arrayStruct*) handle->arrayBase=base;
   (arrayStruct*) handle->length=length;
   push handle;
   }.

4. A computer implemented method of providing application layer access to a fixed memory address space for an application in a language designed to prevent accessing particular memory locations directly, the method comprising:
   constructing an object in the context of the language having elements which occupy said fixed memory address space;

whereby the application is provided access to the fixed memory address space directly through said object;

identifying the fixed memory address space to be a hardware peripheral's memory mapped registers;

wherein constructing an object comprises:

defining a memory map having a predetermined address space for the hardware peripheral, and allocating at least one additional address space contiguous with the predetermined address space;

storing object header information for the Java object directly in the additional address space;

creating an object handle for the object which points to the object header;

defining a new class having a base address parameter which is used in constructing said object;

wherein the new class is substantially defined in pseudocode as follows:

```
Class AnchoredArray
{
public int element[ ];
public AnchoredArray(int baseAddress)
{
element=lockDownElements(type,baseAddress);
Static private native int[ ] lockDownElements(int baseAddress);
}
Void AnchoredArray_lockdownElements( )
{
int base=popstack( );
pushStack(base);
}.
```

\* \* \* \* \*